United States Patent [19]

Warnke

[11] Patent Number: 4,491,333
[45] Date of Patent: Jan. 1, 1985

[54] SKI FOR SNOWMOBILE

[75] Inventor: Wayne L. Warnke, Coon Rapids, Minn.

[73] Assignee: Yamaha Hatsudoki Kabushiki Kaisha, Iwata, Japan

[21] Appl. No.: 410,270

[22] Filed: Aug. 23, 1982

[51] Int. Cl.³ .............................. B62M 27/02
[52] U.S. Cl. .................................... 280/28
[58] Field of Search ................. 441/68; 280/606, 609, 280/12 K, 28, 21 R, 16, 17, 21 A, 608; 180/190

[56] References Cited

U.S. PATENT DOCUMENTS

| 3,530,950 | 9/1970 | Lamb | 280/21 A |
| 3,643,979 | 2/1972 | Richards | 280/28 |
| 3,871,675 | 3/1975 | Lund | 280/28 |
| 4,077,639 | 3/1978 | Reedy | 280/28 |

FOREIGN PATENT DOCUMENTS 95991 6/1939 Sweden .............................. 280/28

Primary Examiner—Joseph F. Peters, Jr.
Assistant Examiner—Michael Mar
Attorney, Agent, or Firm—Orrin M. Haugen; Thomas J. Nikolai; Douglas L. Tschida

[57] ABSTRACT

In a steering ski, for a snowmobile, of the type having an elongated body continuous with an upturned forward tip, the improvement which comprises flares extending along the body and upturned at angles in the range between 30° and 60°, the flares continuing around the forward tip in a downwardly concave arcuate lip configuration.

1 Claim, 8 Drawing Figures

SKI FOR SNOWMOBILE

TECHNICAL FIELD

This invention relates to the field of vehicles for travel on snow, and particularly to the design of steering skis for snowmobiles.

BACKGROUND OF THE INVENTION

The conventional snowmobile has a rearwardly disposed drive belt and a forward steering assembly, the steering assembly comprising a pair of laterally spaced runners or skis. Skis for this purpose have generally been flat over a majority of their length, with downwardly projecting central longitudinal keels, and with upturned front tips to maintain the skis at the surface of the snow as they move forward. When it is desired to turn the vehicle, the two skis are manually rotated as a unit about a vertical axis, and the turning force on the vehicle is essentially that exerted by the snow on the downwardly depending keels of the skis. For optimum support or "floatation" on soft snow, it is desirable that the skis be relatively wide, but wider skis also limit the maneuverability and speed of the vehicle in that they tend to exert a greater drag or snow plowing effect. Wide skis also are less desirable from a maneuverability standpoint on hard-packed snow.

It is also well known that when traveling at high speeds on soft snow, the tips of the skis project powdery snow upward causing it to fly in the face of the vehicle driver and limit his visibility.

BRIEF SUMMARY OF THE INVENTION

The present invention comprises improved steering skis for snowmobiles, characterized by lateral flares extending along one or both edges of the skis, the flares being upturned at angles, preferably of about 45°, with respect to the horizontal, primary snow-engaging surface of the skis to give better steering and increased flotation on soft snow without degrading performance on hard packed snow, and further characterized by downwardly curved lips extending around the forward, up-turned tips of the skis, to deflect snow away from the vehicle driver. The improved cornering performance of the snowmobile employing the skis of the present inventor is due primarily to the lift provided to the skis by the interaction of the edge flares with the snow as those flares are presented to the snow during a turn. While turning, the flares act in much the same manner as does the conventional upturned tip on the front of a ski when the ski is moving in a straight line path. Snow is forced under the flares during a turn and an upward flotation force on the ski results.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views.

DESCRIPTION OF THE PREFERRED EMBODIMENT

Figure 1:
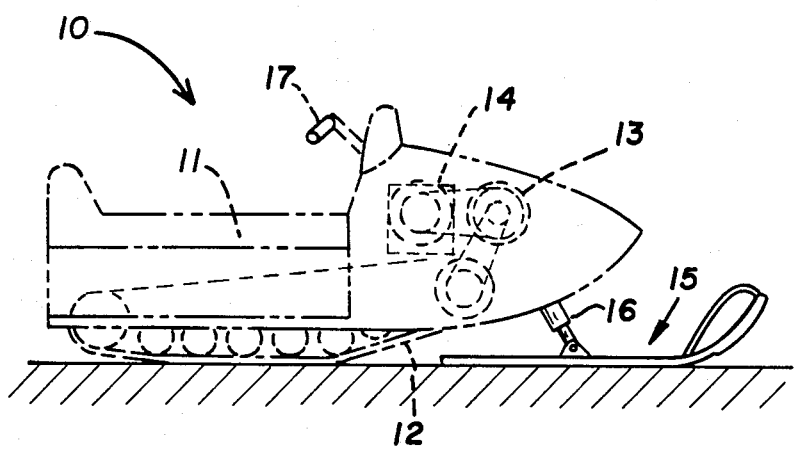
FIG. 1 shows in general terms a snowmobile equipped with steering skis.
Figure 3:
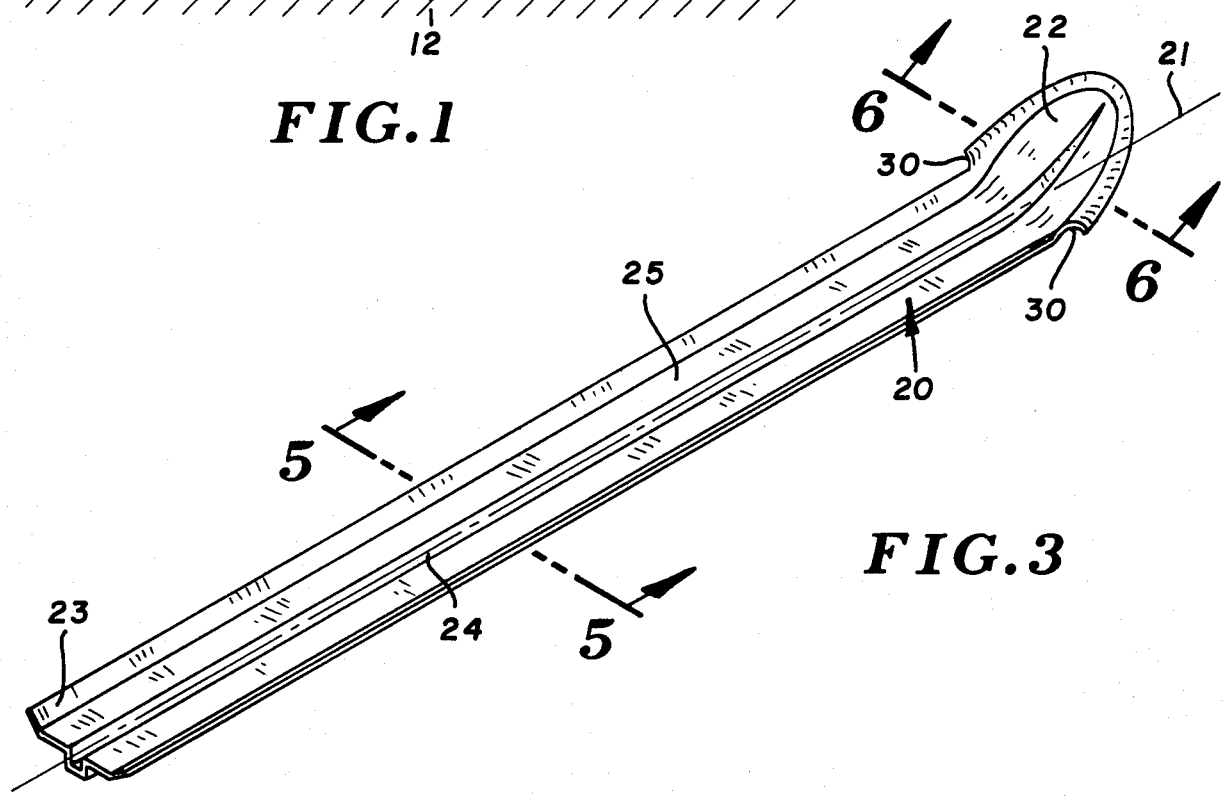
FIG. 3 is a view in perspective of a single ski according to the invention.

Referring first to FIG. 1, a snowmobile 10 is shown to comprise a body 11 supported rearwardly by an endless belt 12 maintained in orbital movement through a power transmission 13 by an engine suggested at 14. Forwardly, the body is supported on a steering assembly 15 rotatable about a generally vertical axis 16 by a steering handle 17, and including a pair of steering skis mutually spaced transversely to give the vehicle lateral stability.

A snowmobile steering ski 20 according to the invention is shown in FIGS. 3–6 to comprise a generally planar, formed sheet-metal member which is elongated along an axis 21 and which has an upturned forward tip 22. A central longitudinal keel 24, which may be integrally formed by bending, projects downward from the bottom surface of the ski. The primary, snow-engaging surface of the ski is generally flat transversely as at 25.

Figure 5:
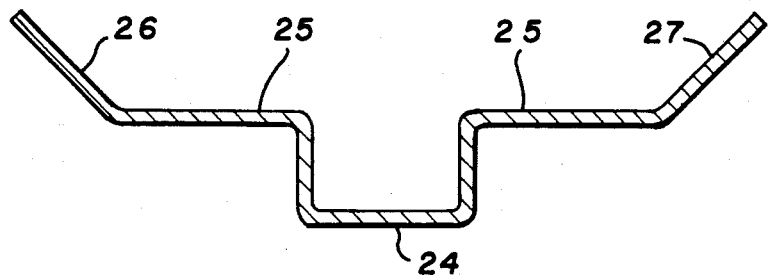
FIG. 5 is a transverse sectional view along the line 5—5 of FIG. 3.
Figure 6:
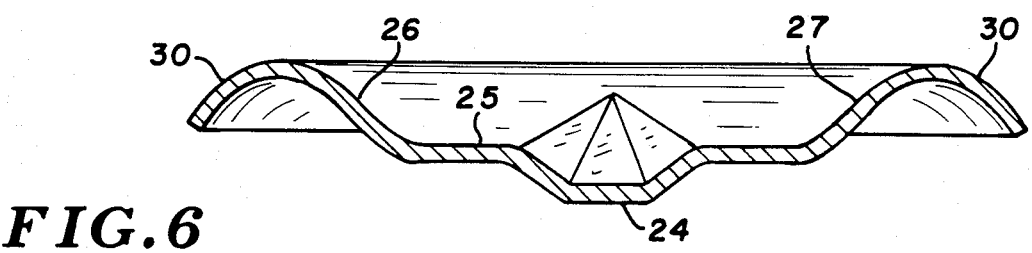
FIG. 6 is a transverse sectional view along the line 6—6 of FIG. 3.
Figure 7:
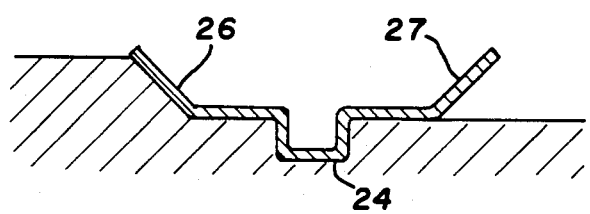
FIG. 7 is a view like FIG. 2 but showing the action of a steering ski according to the invention during a turn in soft snow.

FIG. 5 shows that both edges of the ski comprising one embodiment of the invention are turned up to define flares 26 and 27. These flares serve to increase the effective width of the ski, and hence the floatation supplied by the ski, as it settles in soft snow. It also provides additional snow engaging surface for lateral action against the snow, to assist the keel in the performance of turns. This is shown diagrammatically in FIG. 7. While an angle of 45° with respect to the primary snow-engaging surface 25 is preferable for the flares 26 and 27, other angles in the range of from 30° to 60° may also be useful.

In a turn, as the skis are rotated to a position at an angle to the normal path of travel of the vehicle, the upturned flare on the outside edge of the forwardmost ski and the inside edge of the other ski interact with the snow and a lifting force is created which enhances the cornering performance.

Figure 2:
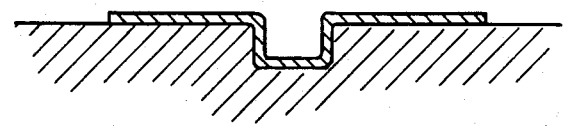
FIG. 2 is a diagrammatic transverse sectional view of a conventional prior art steering ski in soft snow.
Figure 4:
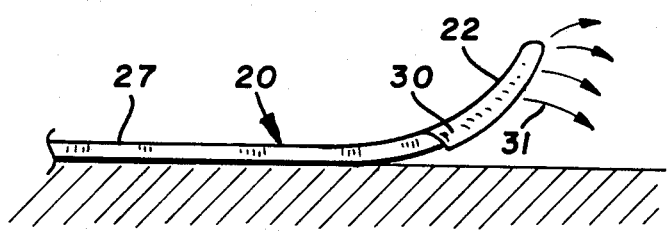
FIG. 4 is a side view of the forward portion of a ski according to the invention.

In that the flares do not materially interact with the snow when the snowmobile vehicle is traversing hard-packed snow or ice, the skis in accordance with this invention behave the same way as more narrow ones, such as those of the prior art (FIG. 2), narrow skis of course, being preferred from a handling and cornering standpoint when operating on hard-pack and ice.

Flares 26 and 27 are preferably continuous, to meet at tip 22. Around the tip, the edges of the flares are extended outwardly by a downwardly concave, arcuate lip 30. This lip on the ski's tip portion acts to deflect the snow forwardly and outwardly to thereby reduce the amount of snow which flies into the face of the vehicle driver, as indicated at 31 in FIG. 4.

Figure 8:
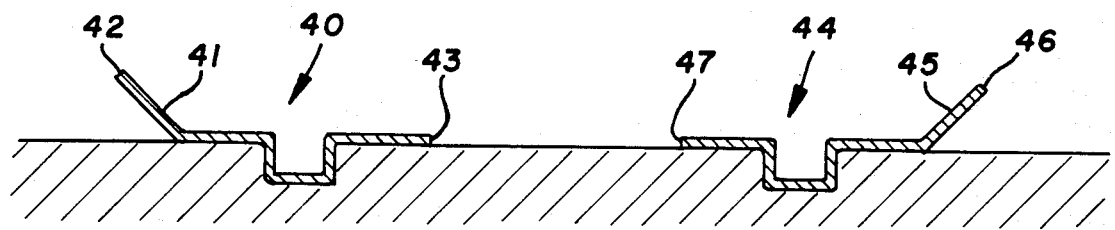
FIG. 8 is a view generally like FIG. 4 but showing a pair of skis having a modified embodiment of the invention.

Another option available to further increase the maneuverability of snowmobile skis in heavy wet snow is shown in FIG. 8. Here, the outer edges of the steering skis of a pair are flared as described above, while the inner edges of the skis are left flat. Specifically, left ski 40 has a flare 41 along its outer edge 42, but is unflared along its inner edge 43, and right ski 44 has a flare 45 along its outer edge 46, but is unflared along its inner edge 47.

This type of construction adds to maneuverability in heavy wet snow. Cornering of the snowmobile is facilitated because there is less plowing by the inside edges of the skis during turns. The flared outside edges continue to provide the desired increased life and floatation. This arrangement presents the disadvantage from a manufacturing cost standpoint, however, of requiring two non-identical items.

From the above, it will be evident that I have invented a novel steering ski for snowmobiles, which has improved steering and flotation characteristics in soft snow or heavy wet snow without having increased drag on hard packed snow, and which deflects the snow thrown by the advancing ski tips so as to minimize the amount reaching the vehicle driver.

Numerous characteristics and advantages of the invention have been set forth in the foregoing description, together with details of the structure and function of the invention, and the novel features thereof are pointed out in the amended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. In a steering ski, for a snowmobile, of the type having an elongated body with a primary snow-engaging surface, said body being continuous with an upturned forward tip, the improvement which comprises flares extending along the side edges of said primary snow-engaging surface and upturned at angles in the range between 30° and 60°, said flares continuing around said forward tip in a downwardly concave arcuate configuration.

* * * * *